Aug. 30, 1938.    R. E. BRIGGS    2,128,349
BAR SCREEN SCRAPER
Filed July 1, 1936    2 Sheets-Sheet 2
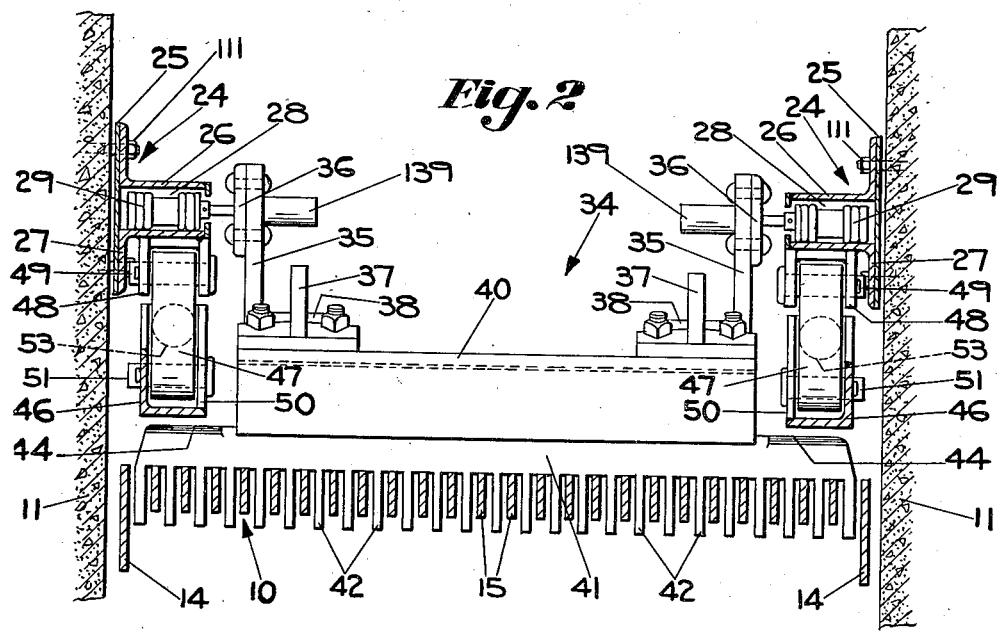
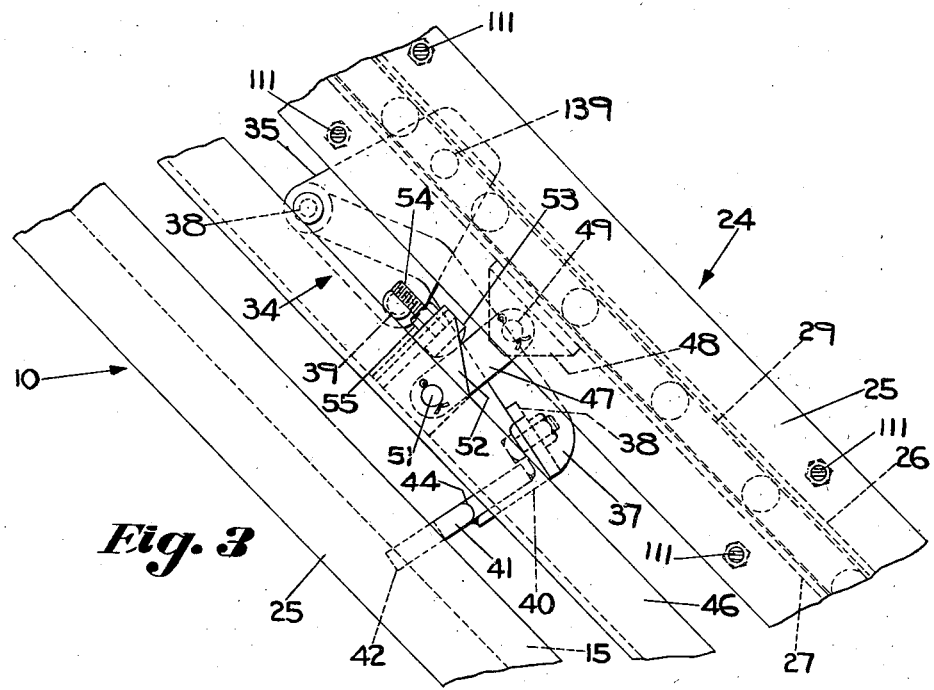
INVENTOR:
ROBERT E. BRIGGS,
BY
Chas. M. Nissen,
ATT'Y.

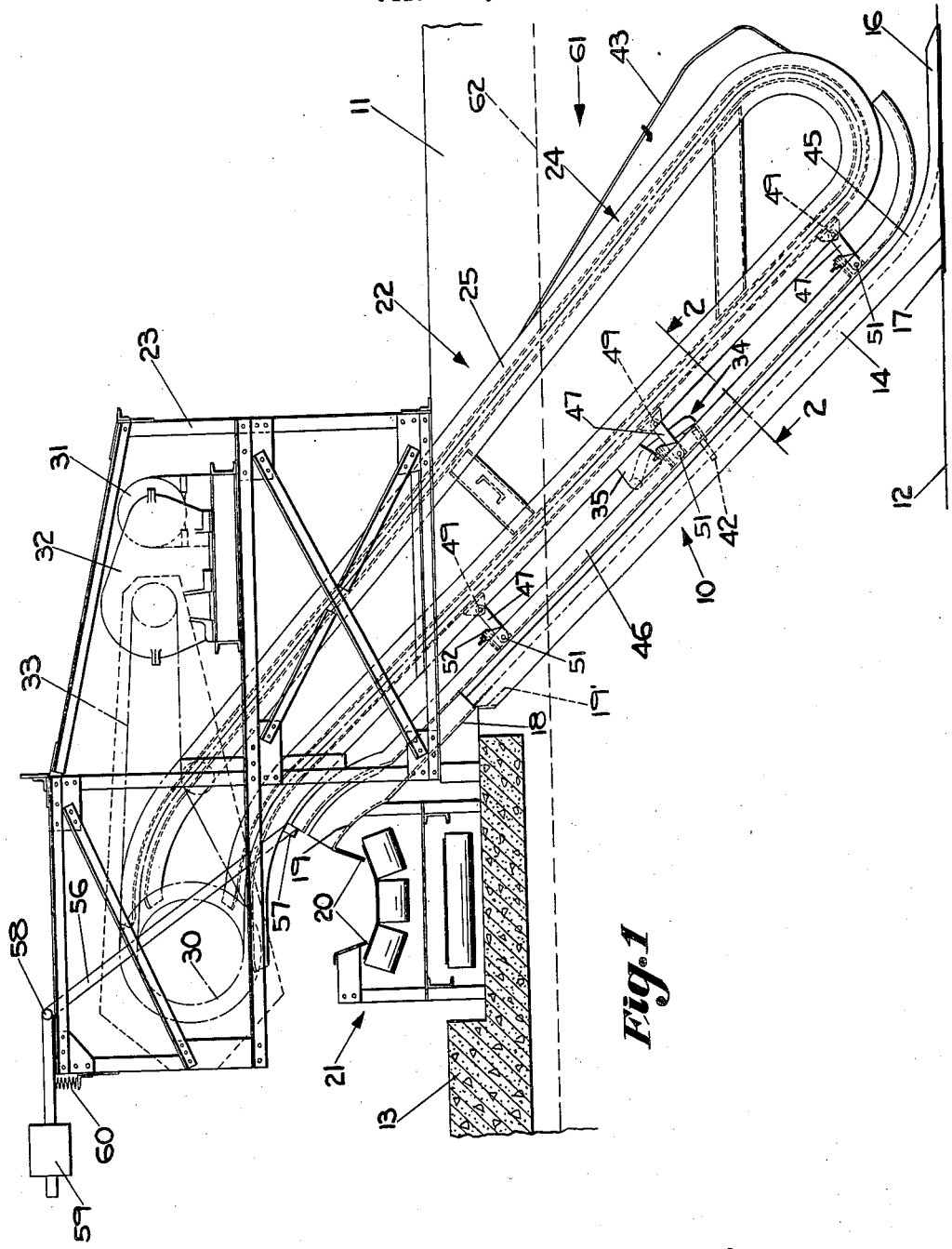

Patented Aug. 30, 1938

2,128,349

UNITED STATES PATENT OFFICE 2,128,349

BAR SCREEN SCRAPER

Robert E. Briggs, Columbus, Ohio, assignor to The Jeffrey Manufacturing Company, a corporation of Ohio Application July 1, 1936, Serial No. 88,439

15 Claims. (Cl. 210—176)

This invention relates to apparatus for removing accumulated trash or refuse from a sewage or fluid stream including a stationary screen and a rake adapted to be moved thereover and particularly to means for yieldably maintaining an interleaving relation between the rake teeth and the bars of the screen.

An object of the invention is to provide, in a device of the above mentioned type, a relatively rigid, though yieldably mounted cam for urging a rake into interleaving relation with the bars of a screen while permitting separation of said interleaving relation in case an immovable obstruction is encountered by the rake in travelling over the screen.

Another object of the invention is to provide an elongated cam which extends substantially the full length of a screen to maintain a pivoted rake in operative relation with said screen.

Other objects of the invention will appear hereinafter, the novel features and combinations being set forth in the appended claims.

In the accompanying drawings,

Fig. 1 is a side elevational view of the device comprising my invention;

Fig. 2 is a transverse sectional view taken on the line 2—2 of Fig. 1, looking in the direction of the arrows; and Fig. 3 is an enlarged side elevational view of a detail showing particularly the rake mounting and the cam mounting.

Referring particularly to the drawings, my invention comprises a screen 10 adapted to be submerged in a sewage stream which flows in a trough formed by side walls 11, 11, and a bottom floor 12, preferably forming a monolith of poured concrete. An upper floor 13, also of poured concrete, may be provided to support the super-structure hereinafter described. The hereindisclosed bar screen is adapted to extend from the floor 12 in an inclined direction as shown in Fig. 1 and occupy the space between the walls 11 of the trough, as shown in Fig. 2. It should be understood, however, that my improvements are not limited for use in connection with a rake interleaved with a grating screen as the upwardly yieldable cam mechanism hereinafter more fully explained is also applicable to scraper conveyor mechanism comprising an imperforated conveyor bed or way along which slides straight transverse scraper flights.

The screen 10 is formed by a pair of parallel spaced side plates 14, 14 and a plurality of parallel spaced grating bars 15. Adjacent their bottoms, the side plates 14 and the grating bars 15 are curved, as indicated at 16 in Fig. 1, and are rigidly attached, as by welding, to a plate 17 preferably embedded in the bottom or floor 12 of the trough. Adjacent their tops the side plates 14 and the grating bars 15 are rigidly attached, as by welding, to an imperforate chute plate 18 provided with a curved upper portion 19 which leads to a trough 20 associated with a transverse belt conveyor 21, and a lower lip 19'.

Associated with the screen 10 is a cleaning mechanism 22 formed by a frame or super-structure 23 which supports a pair of spaced U-shaped guide tracks 24, one adjacent each of the side walls 11 of the sewage trough. Each of the guide tracks 24 is formed by a side plate 25 bent generally in the shape of a U, which carries top and bottom angle members 26, 27 which are spaced apart to form a guide channel 28 for a continuous draft chain 29. To drive the draft chains 29 I provide drive sprockets 30, 30, one for each chain 29, which are supported by the super-structure 23, said sprockets 30 being driven from an electric motor 31 through speed reduction mechanism 32 and appropriate chain and sprocket mechanism 33. In the interest of clearness the sprockets 30 and chain and sprocket mechanism 33 are only shown schematically.

The guide tracks 24 are supported from the super-structure 23 and from the side walls 11 by appropriate anchor means 111, so that the lower run of each guide track 24 will be positioned a substantially uniform distance above the screen 10 throughout its entire length.

Guided and supported by the guide tracks 24 and the draft chains 29 is a pivoted rake mechanism 34. Said rake mechanism 34 is formed by a pair of spaced plates 35 which are rigidly attached to the chains 29 by brackets 36. Each of the plates 35 carries a pivoted arm 37 mounted upon a pivot 38. Cooperating with each arm 37 is a stop lug 39 which restricts the pivotal movement of the arm 37 in one direction, and a stop lug 139 which restricts its movement in the other direction. Arms 37 are rigidly connected together by an angle member 40 to which is rigidly attached, as by welding, a rake plate 41 provided with teeth 42 adapted to interleave with the grating bars 15 while extending through the spaces between them. It will thus be seen that the rake mechanism 34 is pivoted to swing about the axis of pivots 38 either to interleave with the grating bars 15 or to swing free thereof. It will be evident that the force of gravity acting upon the rake mechanism 34 will tend to urge the teeth 42 into interleaving relation with the grating bars 15.

Associated with the bottom portions of the upper runs of guide tracks 24 are lifting cams 43. When the rake mechanism 34 moves downwardly along the upper runs of the guideways 24, the lifting cams 43 will lift said rake mechanism 34 by cooperating with the friction shoulders 44 thereof to gradually move the rake from a position against the stop lugs 139 to a position against the stop lugs 39, thus to prevent a severe shock which would otherwise be incident to the rake mechanism 34 moving about the curved lower portion of the guide tracks 24. It will be obvious that in the movement of the rake mechanism 34, after leaving the lifting cams 43, the teeth 42 thereof will ride over the plate 17 in interleaving relation with the curved portion 16 of the grating bars 15, thus to insure a complete intermeshing thereof before the rake encounters the principal refuse accumulating area on the screen 10, which will be adjacent the curved portion 45 thereof. This will insure a thorough cleaning of the screen 10 for each operation of the rake mechanism 34 thereover.

It has been found in practice that there is a tendency for the material which is gathered by the rake mechanism 34 as it travels over the screen 10 to roll up ahead of said screen mechanism 34 with a tendency for the teeth 42 to be forced out of their interleaving relation with the grating bars 15, thus failing to clean the screen 10 effectively. In some cases, as where an irremovable obstruction is encountered, this disengagement is desired, but it is preferred that the disengagement only be allowed where an unusually heavy load is placed on the screen mechanism 34, or in other words, where a very severe obstruction is encountered.

In order to maintain yieldably this interleaving relation while permitting its discontinuation under very severe conditions, I provide a pair of longitudinally extending cam members 46, 46, formed by angles, to cooperate with the friction shoulders 44 of the rake plate 41, throughout substantially their entire travel over the screen 10, including their travel over the chute plate 18. Said cams 46 are preferably made of angle members so they will be very rigid and thus not easily broken by the large forces encountered.

Each of the cam members 46 is pivotally supported from the lower run of an angle member 27 of a U-shaped guide track 24 by a plurality of pivoted links 47 pivotally mounted on said angle members 27 by brackets 48 and pins 49 and pivotally attached to said cam members 46 by brackets 50 and pins 51. It will be evident that the links 47 comprise a parallel motion mechanism which maintain the cam members 46 in parallel relation with the screen 10 at all times.

As clearly seen in Fig. 1 of the drawings the links 47 do not hang vertical, which would be their normal position as urged by gravity. To maintain said links and said cam members 46 in their normal position, as illustrated in Figs. 1 and 3 of the drawings, said cam members 46 carry brackets 52, which in turn carry adjustable stops 53 held on said brackets 52 by threaded shafts 54 and nuts 55. The stops 53 are positioned to abut the links 47 and thus to maintain said links 47 normally in the position illustrated in Figs. 1 and 3. It will be evident that the stops 53 do not prevent the upward movement of the cam members 46 under the influence of the rake mechanism 34 when the latter meets a serious obstruction.

It is to be noted that the imperforate chute plate 18 has a lower lip 19' which acts as a cam to lift the rake teeth 42 onto said chute plate 18 while carrying the refuse with said rake, with the teeth 42 in contact with said plate 18.

To insure the removal of all refuse from the rake a wiping mechanism, including a cross-bar wiper 57, is positioned to contact the top of the rake plate 41 and moves downwardly thereacross as the rake 34 continues its forward movement. To provide this wiping action the wiping member 57 is carried by a pair of pivoted members 56, 56, one at each end thereof, which members 56, 56 are pivotally supported upon the superstructure 23 for movement about a pivot 58. A weight 59 is provided to maintain said wiping mechanism normally in the position illustrated in Fig. 1 of the drawings and a bumper spring 60 receives the shock incident to the return of said mechanism to its normal position after performing a wiping operation.

In the operation of the device comprising my invention, motor 31 will be effective to drive the continuous draft chains 29 through the drive mechanism, previously described, either in a continuous or intermittent manner. As the draft chains 29 carry the rake mechanism 34 down into the sewage stream, which may flow in the direction of the arrow 61, and have a normal height as indicated by the line 62, the rake mechanism 34 will be lifted by the lifting cams 43 to a position adjacent the stop lugs 39. As the rake mechanism 34 rounds the bottom of the guides 24, the teeth thereof will engage the plate 17 adjacent the curved portion 16 of the screen bars 15 and become interleaved therewith at a position upstream of the refuse accumulation area 45. As the rake mechanism 34 is drawn up over the screen 10 with the teeth thereof interleaving the grating bars 15, it will clean said screen 10 of accumulated refuse which may tend to roll up ahead of the screen. This tendency may urge the rake mechanism 34 out of its interleaving relation with the screen 10 which will not be resisted except by the weight of the rake mechanism 34 until the friction shoulders 44 contact the cam members 46. This is a limited movement in sufficient to disengage the teeth 42 from their interleaving relation with the grating bars 15.

The cam members 46, due essentially to their weight, resist appreciably any further movement of the rake mechanism 34 toward the disengagement of the aforementioned interleaving relation and actually permit the discontinuation of said interleaving relation only in case an unusual overload, or a substantially irremovable obstruction, is encountered. Should this event take place, the rake mechanism 34 will ride over the irremovable obstruction to discharge part of its excess load to be gathered on a subsequent trip, while conveying up the chute plate 18 and over the curved portion 19 into the trough 20, the accumulated refuse. The rake wiping mechanism, including the connecting member 57, will insure a complete discharge of all of the refuse collected by the screen mechanism 34. The belt conveyor 21 will, of course, convey away the refuse received by the trough 20. It is thus evident that a very effective means has been provided to insure an efficient and thorough cleaning of the screen during each cycle of the rake mechanism 34 while providing a rake mechanism which can yield under abnormal conditions.

It is also to be noted that the U-shaped guide tracks 24 eliminate entirely the presence of rotary sprockets or any other rotary mechanism for guiding and supporting the draft chains 29 within the sewage stream.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In sewage screening apparatus, the combination with a stationary screen positioned to extend within a sewage stream with a portion thereof projecting out of said stream, of a pivoted rake, means for moving said rake along said screen, cam means extending substantially the entire length of that portion of said screen which is within said stream, said cam means being above and normally out of contact with said rake during its upward travel along said screen and being constructed and arranged to maintain said rake in interleaved relation with said screen, and means mounting said cam for limited movement away from said screen.

2. In sewage screening apparatus, the combination with a stationary screen positioned to extend within a sewage stream, of a pivoted rake, means for moving said rake along said screen with its teeth interleaving said screen, and yieldable cam means extending throughout that length of the screen which is within the stream, said cam means being constructed and arranged to maintain said interleaving relation.

3. In sewage screening apparatus, the combination with a stationary screen positioned to extend within a sewage stream, of a pivoted rake, means for moving said rake along said screen, and cam means for releasably maintaining said rake in operative relation with respect to said screen comprising a rigid member and yieldable means holding said member yieldably in parallelism with said screen.

4. In a sewage screening apparatus, the combination with a stationary screen, of a rake, means guiding said rake along said screen to clean it of refuse, and means constructed and arranged to maintain yieldingly said cleaning relation comprising a rigid cam and means mounting it for limited movement away from said screen while tending to urge said rake into cleaning relation with respect to said screen.

5. In sewage screening apparatus, the combination with a screen, of a pivoted rake, endless draft chains for driving said rake, guide means for said chains, cam means for said rake comprising rigid members pivoted to said guide means and urging said rake in operative relation with said screen throughout substantially its entire travel over said screen.

6. In sewage screening apparatus, the combination with a screen, of a pivoted rake, endless draft chains for driving said rake, guide means for said chains, cam means for said rake comprising rigid members pivoted to said guide means and urging said rake in operative relation with said screen.

7. In sewage screening apparatus, the combination with a screen, of a rake, means for moving said rake over said screen, means constructed and arranged to maintain said rake in operative relation with said screen comprising a rigid cam, and supporting means for said cam constructed and arranged to permit and maintain parallel motion thereof under the influence of said rake, said last named means including spaced pivoted links supporting said cam.

8. In sewage screening apparatus, the combination with a screen, of a rake, means for moving said rake over said screen, means constructed and arranged to maintain said rake in operative relation with said screen comprising a rigid cam, and supporting means for said cam, said supporting means being constructed and arranged to permit and maintain parallel motion thereof away from said screen in its entirety under the influence of said rake.

9. The combination with an inclined grating screen adapted to extend from the floor of a chamber between the side walls thereof while partially submerged in a flowing stream in said chamber, of supporting framework adapted to be supported above said chamber, rake mechanism adapted to travel upwardly along said screen out of said chamber, endless draft means connected to said rake mechanism, a guide frame for said endless draft means and supported by said framework to extend downwardly therefrom approximately parallel to said grating screen and spaced above the same, and yieldable abutment mechanism including a rigid rake contacting cam suspended from said guide frame in position to engage the rake mechanism and hold the same down to its work when said rake mechanism moves upwardly under the influence of material on said screen.

10. The combination with conveyor apparatus comprising a traveling flight, of spaced-apart elongated abutments in positions adjacent to the tops of opposite ends of said flight to maintain the same in its working path of travel, mechanism comprising links for flexibly suspending said elongated abutments, and stops on said elongated abutments in positions to engage said links to limit the movement of said abutments toward said flight.

11. The combination with a conveyor bed, of a transverse flight movable along the same, endless draft mechanism, means for pivotally mounting said flight on said draft mechanism for movement away from said bed when said flight engages an obstruction thereon, parallel spaced-apart abutment bars above said flight and in close proximity with the ends thereof, a guide frame for said draft mechanism, links for suspending said bars from said guide frame to provide a parallel motion movement of the bars away from said bed when the flight yields upwardly upon engaging the aforesaid obstruction, and stops on the tops of the bars in position to engage the links so as to prevent the bars from moving into engagement with the flight when the latter is traveling normally along said bed.

12. In a conveyor apparatus, the combination with a surface, means including a flight movable over said surface to remove material therefrom, cam means for urging said flight into operative relation with said surface when it tends to move away therefrom, and a plurality of parallel links for suspending said cam means for movement in parallelism with and away from said surface when moved by said flight.

13. The combination with a conveyor bed, of a flight for conveying material thereover, draft mechanism for said flight, means for mounting said flight and draft mechanism to permit movement of said flight away from said bed when an obstruction is encountered thereby, parallel spaced-apart abutment bars adjacent said flight and contactable thereby when said flight moves away from said bed as aforesaid, and means for supporting said bars to provide parallel motion movement thereof away from said bed when moved by said flight, said abutment bars being constructed and arranged to urge said flight into operating relation with said bed when it is moved away from said bed as aforesaid.

14. In conveyor apparatus, the combination with a bed, of a pivoted flight, endless draft chains for moving said flight over said bed, guide means for said chains, cam means for said flight comprising rigid members pivoted to said guide means and positioned to urge said flight in operative relation with said bed throughout substantially the entire travel of said flight over said bed when said flight moves away from said bed.

15. In conveyor apparatus, the combination with a stationary conveyor bed, of a pivoted flight, draft means for drawing said flight along said bed to convey material thereover, a rigid cam extending substantially the entire length of said bed and parallel therewith and positioned to urge said flight into contact with said bed by its weight, and means supporting said cam for movement in parallelism toward and away from said bed.

ROBERT E. BRIGGS.